Aug. 4, 1970    C. W. CALHOUN    3,522,727
MEASURING APPARATUS FOR DRILLING RIGS
Filed Dec. 27, 1968    2 Sheets-Sheet 1
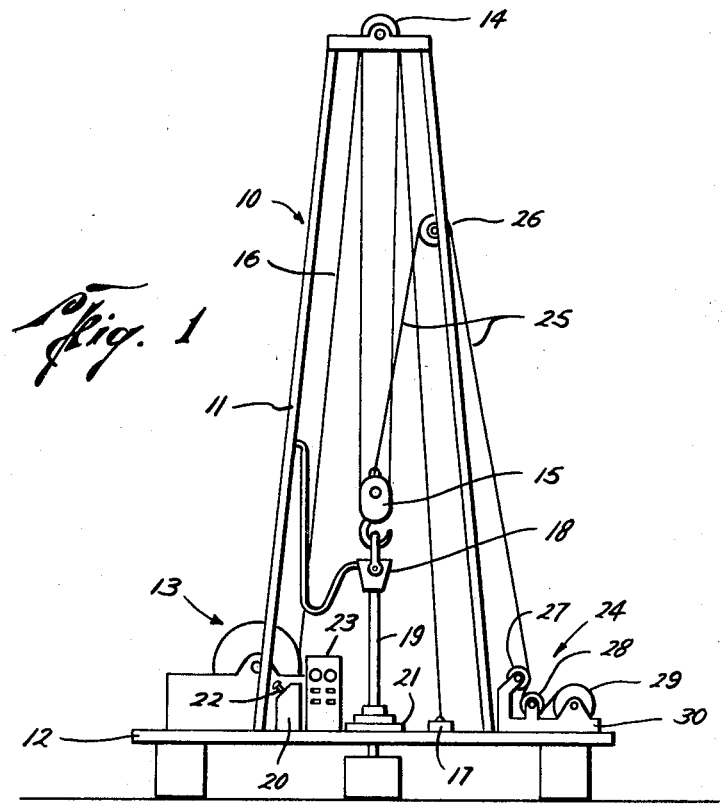
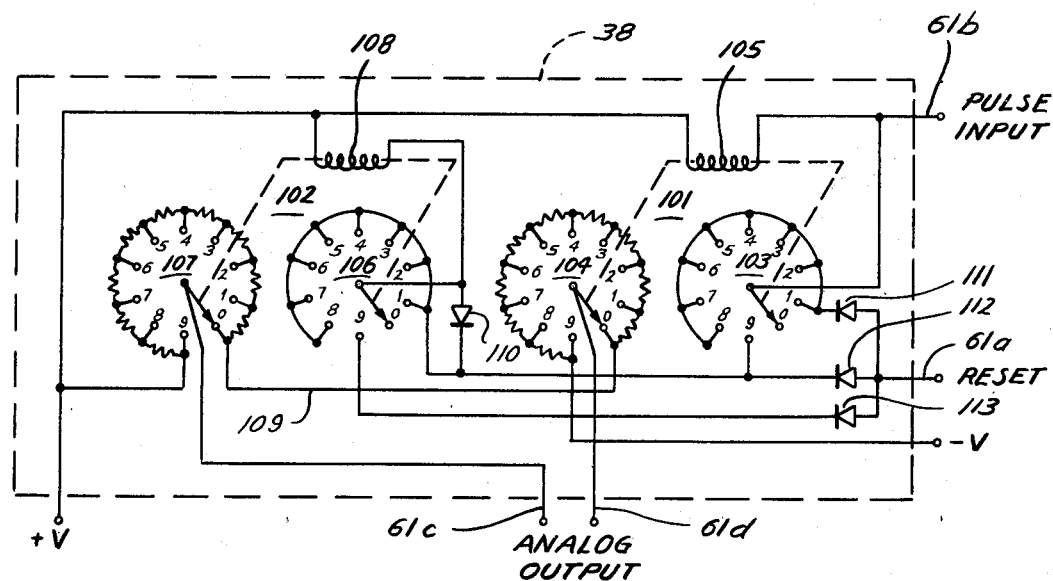
Charles W. Calhoun
INVENTOR
BY
Hayden Pravel Wilson & Matthews
ATTORNEYS

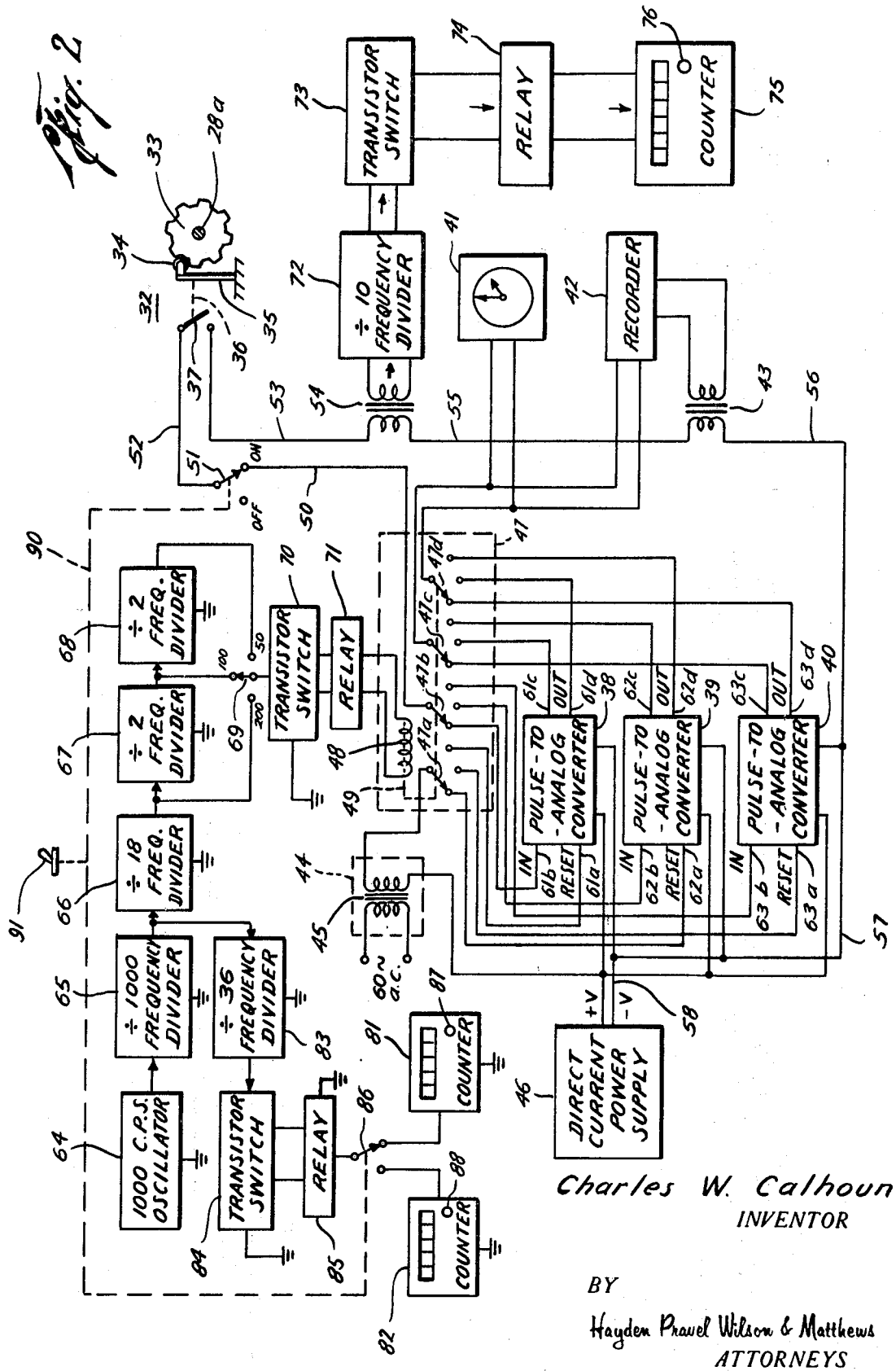

United States Patent Office 3,522,727
Patented Aug. 4, 1970

3,522,727
MEASURING APPARATUS FOR
DRILLING RIGS
Charles W. Calhoun, Houston, Tex., assignor, by mesne assignments, to Tenneco Oil Company, Houston, Tex., a corporation of Delaware
Filed Dec. 27, 1968, Ser. No. 787,469
Int. Cl. E21b 45/00
U.S. Cl. 73—151.5                      12 Claims

ABSTRACT OF THE DISCLOSURE

Measuring apparatus for determining the rate of penetration of a drill bit in drilling an oil well type borehole into the earth. A pulser mechanism is operated by a measuring line which is attached to the traveling block of a rotary drilling rig for producing pulses representing incremental amounts of downward movement of the drill pipe supporting the drill bit. Three pulse-to-analog integrator units are provided for taking turns counting the pulses from the pulser mechanism and supplying to a signal indicator an analog signal proportional to the number of pulses counted. A stepping relay mechanism operates so that at any given instant the input of one integrator unit is coupled to the pulser mechanism, the output of another integrator unit is coupled to the signal indicator and the third integrator unit is coupled to a reset signal source. A timing circuit advances the stepping relay mechanism at a periodic rate which thus determines the duration of the successive integration intervals. The signal indicator is calibrated to express the rate of penetration in terms of fee per hour.

BACKGROUND OF THE INVENTION

This invention relates to measuring apparatus for monitoring the progress of well drilling operations, and particularly to apparatus for measuring the rate at which the hole is being drilled.

In the drilling of oil well type boreholes into the earth, the methods heretofore used for measuring the rate at which the hole is being drilled or, in other words, the "rate of penetration" have been relatively crude and not entirely satisfactory. One method which has been frequently used in the case of rotary drilling rigs is to place a chalk mark on the drill pipe at an appropriate point above the rotary table and then to measure the time required for the chalk mark to move downwardly through a predetermined distance. From this measurement, the rate of penetration can be calculated. Another method which has been used is to record the time interval which elapses between the time each joint of drill pipe is connected into the drill string and the time it becomes necessary to connect the next joint into the drill string. From previous measurement of the length of each joint, it is then possible to calculate the average rate of penetration for each joint.

The chalk marking method generally does not provide a high degree of accuracy and furthermore requires too much attention on the part of the drilling crew. The joint recording method, on the other hand, requires a knowledge of the length of each pipe joint in order to calculate the actual value of the penetration rate. More importantly, perhaps, this latter method takes too long before the driller is informed of the penetration rate. This is because some ten to twenty minutes or more may elapse before it becomes necessary to add another joint of drill pipe to the drill string.

SUMMARY OF THE INVENTION

It is an object of the invention, therefore, to provide new and improved measuring apparatus for determining the rate of penetration of a drill bit in drilling a borehole into the earth.

It is another obect of the invention to provide a new and improved rate of penetration measuring apparatus for automatically providing the driller with accurate and easy to read indications of the rate of penetration of the drill bit with very little time lag between the current indicated value and the current instantaneous value at the drill bit.

It is a further object of the invention to provide new and improved rate of penetration measuring apparatus which automatically computes the rate of penetration value in feet per hour without the need for manually measuring or observing any drill pipe lengths.

It is an additional object of the invention to provide new and improved rate of penetration measuring apparatus which also provides automatic indications of the total bit footage and the total bit drilling time.

In accordance with the invention, measuring apparatus for determining the rate of penetration of a drill bit in drilling a borehole into the earth comprises transducer means for sensing downward movement of the drill pipe supporting the drill bit and producing electrical signal changes indicative of such movement. The measuring apparatus further includes circuit means for detecting the electrical signal changes over a predetermined time interval for producing an output signal representing the rate of penetration of the drill bit.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings:

FIG. 1 shows a rotary drilling rig including certain components used in a representative embodiment of the present invention;

FIG. 2 is a block diagram of electrical circuits employed in a representative embodiment of the present invention; and FIG. 3 is a detailed schematic circuit diagram of one of the pulse-to-analog converter units of FIG. 2.

DESCRIPTION OF THE PREFERRED EMBODIMENT

Referring to FIG. 1, there is shown a rotary drilling ring 10 having the usual derrick structure 11 mounted on a drilling platform 12. For simplicity of illustration, various elements of the drilling rig 10 are not shown to scale. The rig 10 includes a hoisting system which includes drawworks 13, crown block 14 and traveling block 15. A drilling line 16 runs from the drawworks 13 and makes multiple loops between the crown block 14 and the traveling block 15, the far end of the line 16 being tied to an anchor 17 which is bolted to the floor of the drilling platform 12. The traveling block 15 supports a swivel 18, a drilling kelly 19 and a string of drill pipe (not shown) connected to the lower end of the kelly 19 and extending downward into the earth. Drawworks 13 is used to reel in and pay out the drilling line 16 and, thus, to raise and lower the traveling block 15 and the string of drill pipe supported by such traveling block 15.

A control panel 20 is located on the floor of the drilling platform 12 and contains the necessary controls for enabling the driller to control the drawworks 13 and a rotary table 21 which causes the rotation of the kelly 19 during the drilling operation. Control panel 20 includes a control handle 22 for operating a braking mechanism on the drawworks 13. A meter panel 23 is located adjacent to control panel 20 and includes various indicators and meters for advising the driller of the operating status of the various ring mechanisms. It includes a weight indicator which indicates the weight supported by the traveling block 15. From this, the driller can determine the weight resting on the drill bit.

The drilling rig 10 also includes a transducer mechanism 24 for sensing downward movement of the drill pipe suspended at the lower end of the drilling kelly 19 and hence, downward movement of the drill bit attached to the lower end of such drill pipe. The transducer mechanism 24 includes a measuring line 25 which passes upwardly and over a sheave 26 and then downwardly to the traveling block 15, to which this end of the line 25 is attached. The other end of the measuring line 25 passes over an idler wheel 27, around a measuring wheel 28 and onto a retriever spool or drum 29. Idler wheel 27, measuring wheel 28 and retriever spool 29 are rotatably mounted on a suitable support assembly 30 which is fastened to the floor of the drilling platform 12. The retriever spool 29 is continuously driven by an air motor (not shown) which operates in a direction to wind the measuring line 25 onto the retriever spool 29. This air motor is driven from the drilling rig air supply and the torque provided by this air motor is adjusted so as to be sufficient for rewinding or taking up any slack in the measuring line 25, and yet not so great as to break the measuring line 25. This enables the measuring line 25 to follow the movement of the traveling block 15 and to cause a corresponding rotation of the measuring wheel 28. Measuring wheel 28 is provided with, for example, a six-inch circumference. Coupled to the shaft of the measuring wheel 28 is a pulser mechanism 32 (shown in FIG. 2) for producing electrical pulses representing incremental amounts of measuring line movement and, hence incremental amounts of drill pipe movement.

Referring now to FIG. 2 of the drawings, there is shown a block diagram of electrical circuits which respond to the pulses produced by the transducer mechanism 24 for providing indications of the rate of penetration of the drill bit. As there shown, the pulser mechanism 32 includes a gear wheel 33 which is mounted on the shaft of the measuring wheel 28. Elements 28a in FIG. 2 represents the shaft of the measuring wheel 28. Gear wheel 33 may be provided with, for example, 50 gear teeth. A follower element 34 is mounted on a spring arm 35 and is urged against the teeth of the gear wheel 33 by the spring action of the arm 35. The arm member 35 is mechanically coupled by way of a linkage 36 to a pulser switch 37. The linkage is such that the switch 37 is closed each time one of the gear teeth passes under the follower element 34. Conversely, switch 37 is open when the follower element 34 rests in one of the depressions between the gear teeth. Assuming that the measuring wheel 28 has a six-inch circumference and that the gear wheel 33 has 50 teeth, this means that the switch 37 will be opened and closed 100 times for each foot of downward movement of the traveling block 15 and, hence, of the drill pipe supporting the drill bit. As will be seen, this produces a corresponding number of electrical pulses in the circuit to which the switch 37 is connected.

The measuring apparatus circuits of FIG. 2 also include a plurality of integrator units each of which, when coupled to the pulser mechanism 32, is responsive to the transducer pulses for producing an analog output signal representing the number of such pulses. These integrator units are represented by pulse-to-analog converters 38, 39 and 40. As will be seen, each of the converters 38, 39 and 40 includes a pulse counter mechanism and means for converting the counter total into an analog signal proportional to such total.

The portion of the measuring apparatus shown in FIG. 2 further includes signal indicator means capable of responding to the analog output signals produced by the converters 38, 39 and 40 for providing indications of the rate of penetration of the drill bit. The present embodiment includes two such signal indicator means, one being represented by a dial-type meter 41 and the other being represented by a recorder 42. Recorder 42 may be of either the ink pen and paper chart variety or of the mirror galvanometer and photographic film variety. In either case, the recording medium (the paper chart or photographic film) is advanced as a function of the depth of the drill bit in the borehole, while the recording element (the ink pen or light beam) records thereon a continuous trace of the rate of penetration of the drill bit. The recorder 42 includes an appropriate stepping motor for causing the advancement of the recording medium. This stepping motor is responsive to the pulses generated by the pulser mechanism 32; such pulses being supplied to the recorder 42 by way of a transformer 43.

The electrical circuits of FIG. 2 also include circuit means for supplying reset signals which are used to reset the pulse counter mechanisms contained in the pulse-to-analog converters 38, 39 and 40. This reset circuit means is represented by a reset signal source 44. In the present embodiment, the source 44 comprises a transformer 45 having a pirmary winding which is connected to a sixty cycle per second alternating-current power source when the measuring apparatus is in use.

A direct-current power supply 46 supplies both positive and negative direct-current voltages (+V and —V) to each of the pulse-to-analog converters 38, 39 and 40.

The circuits of FIG. 2 further include switching means for sequentially coupling the pulse-to-analog converters 38, 39 and 40 to the pulser mechanism 32, to the signal indicator means 41 and 42 and to the reset signal source 44. This switching means includes a stepping relay mechanism 47 having a series of four separate switch sections 47a–47d. The movable contact elements of these switch sections 47a–47d are advanced by means of an armature coil 48 and an armature linkage 49 which is mechanically coupled to all four of the movable contact elements.

The movable contace element of the switch section 47b is connected by way of a conductor 50, a master "on-off" switch 51 and a conductor 52 to the pulser switch 37 in the pulser mechanism 32. The other side of the pulser switch 37 is connected by way of conductor 53, primary winding of transformer 43 and conductors 56, 57 and 58 to the negative terminal of the direct-current power supply 46. The three stationary contacts of the switch section 47b are individually connected by way of conductors 61b, 62b and 63b to the pulse input terminals of the converters 38, 39 and 40 respectively. Thus, if the movable contact element of the switch section 47b is in contact with the stationary contact which is connected to the conductor 61b, then (assuming switch 51 is in the position shown), the closing of the pulser switch 37 operates to complete a direct-current circuit which passes through the pulse counting mechanism inside of the converter 38. This causes current to flow from the positive terminal of the power supply 46 through the converter 38, the conductor 61b, the switch section 47b, switch 51, pulse switch 37, transformers 54 and 43 and back to the negative terminal of the power supply 46. Because the pulser switch 37 does not normally remain closed very long, this current flow is in the form of a short pulse of current.

A similar result occurs for the other two pulse-to-analog converters 39 and 40 when the movable contact element of the switch section 47b is in contact with the stationary contacts which are connected to these converters 39 and 40.

The switch sections 47c and 47d are utilized for connecting the analog signal outputs of the converters 38, 39 and 40 to the signal indicator devices 41 and 42. In particular, switch section 47c is operative to selectively connect a single one of first output lines 61c, 62c and 63c to the indicator devices 41 and 42, while the switch section 47d is operative to selectively connect a single one of second output lines 61d, 62d and 63d to the devices 41 and 42. The switch connections are such that the two output lines connected to the devices 41 and 42 at any given instant are from the same one of the converter units 38, 39 and 40.

Switch section 47a is utilized to selectively connect the reset signal source 44 to different ones of the converters 38, 39 and 40. In particular, the secondary winding of the transformer 45 is connected between the positive terminal of the power supply 46 and the movable contact element of the switch section 47a. The stationary contacts of the switch section 47a are connected to different ones of conductors 61a, 62a and 63a which run to reset signal terminals of the converters 38, 39 and 40 respectively. The internal construction of each of the converters 38, 39 and 40 is such that the reset signals supplied thereto by way of the switch section 47a leave the converters 38, 39 and 40 by way of their positive direct-current power supply lines and are returned by such power supply lines to the lower side of the secondary winding of the transformer 45.

The conductors running from the converters 38, 39 and 40 to the stationary contacts of the switch sections 47a–47d are connected to the switch sections in such a manner that at any given instant one of the converters 38, 39 and 40 is connected to the pulser mechanism 32 for counting transducer pulses, another of the converters 38, 39 and 40 is connected to the indicator devices 41 and 42 for supplying an analog signal thereto, and the third of the converters 38, 39 and 40 is connected to the reset signal source 44 so that the reset signals provided by such source can operate to reset such third converter. By advancing the movable contact elements of the switch sections 47a–47d to another set of contact positions, the functions being performed by the converters 38, 39 and 40 are interchanged such that a different one is counting pulses, a different one is supplying the analog output signal and a different one is being reset. The movable contact elements of the switch sections 47a–47d are advanced in unison by supplying a pulse of current to the armature winding 48.

The FIG. 2 circuits also include timing circuit means for supplying periodic timing signals to the stepping relay mechanism 47 for advancing the switch means therein at a predetermined rate. This timing circuit means includes a 1,000 cycle per second oscillator 64 which drives a chain of frequency dividers 65–68. The oscillator 64 is of a high precision type and, as such, may take the form of a tuning fork controlled oscillator. It is the basic timing clock for the present measuring apparatus. The output of the oscillator 64 is preferably of a rectangular or pulse type waveform, in which case the frequency dividers 65–68 may take the form of pulse counters which produce an output pulse each time the counter counts a certain number of input pulses. The divider 65 divides or counts down by a factor of 1,000, the divider 66 counts down by a factor of 18, and the dividers 67 and 68 each count down by a factor of two.

A selector switch 69 is connected to the outputs of the dividers 66, 67 and 68 so as to be able to select the output pulses from any one of these dividers 66, 67 and 68 and to supply the selected pulses to a transistor switching circuit 70. Transistor switching circuit 70 in turn drives a relay 71 which in turn supplies a pulse of current to the armature winding 48 each time a pulse is supplied to the input of the transistor switching circuit 70. Thus, the pulses selected by selector switch 69 serve to cause the advancement of the movable contact elements in the stepping relay 47 by a factor of one step or one stationary contact position for each such pulse.

The pulses appearing at the output of the divider 66 occur at the rate of one pulse every 18 seconds, while the pulses at the output divider 67 occur at the rate of one pulse every 36 seconds and the pulses at the output of the divider 68 occur at the rate of one pulse every 72 seconds. Since these pulses determine the length of time that each of the converters 38, 39 and 40 is connected to the pulser mechanism 32, they thus determine the time duration of the integration interval or counting interval for the pulse counter mechanisms included in each of the converters 38, 39 and 40. Thus, by manipulation of the selector switch 69, integration intervals of 18, 36 or 72 seconds may be selected. As will be seen from the particular construction for the converters 38, 39 and 40 which will be described hereinafter, these integration intervals provide full-scale rate of penetration values of 200, 100 and 50 feet per hour, respectively.

The FIG. 2 circuits further include counter means responsive to the transducer pulses produced by the pulser mechanism 32 for providing an indication of the total footage drilled by the drill bit. This counter means includes transformer 54, a 10:1 frequency divider 72, a transistor switching circuit 73, a relay 74 and a counter 75. The counter 75 is provided with a reset knob or switch 76 for resetting it to zero when desired. The transformer 54 produces across its secondary winding, voltage pulses corresponding to the current pulses produced by the closures of the pulser switch 37. These pulses are counted down by a factor of ten by the divider 72 and the resulting pulses are used to drive the counting mechanism in the counter 75 by means of the transistor switching circuit 73 and relay 74. Counter 75 may be, for example, a six-decade decimal counter which reads total bit footage to the nearest tenth of a foot.

The circuits of FIG. 2 additionally include a pair of counter means coupled to the timing circuit means for providing indications of the total bit drilling time and the total nondrilling time. These counter means are represented by counters 81 and 82, respectively. Timing signals for driving these counters are obtained from the output of the frequency divider 65 and are supplied to the input of a 36:1 frequency divider or pulse counter 83. Since the pulses at the output of divider 65 are occurring at the rate of one pulse every second, the pulses at the output of divider 83 are occurring at the rate of one pulse every 36 seconds. The pulses from divider 83 are used to drive a transistor switching circuit 84, which in turn drives a relay 85. Relay 85 is selectively coupled by means of a selector switch 86 to the counting input of one or the other of the counters 81 and 82. Relay 85 supplies pulses to the selected counter at the same rate that the pulses appear at the output of divider 83, namely one pulse every 36 seconds, or, in other words, one pulse every one-hundredth of an hour. Each of the counters 81 and 82 may be a six-decade decimal counter which reads total time in hours to the nearest one-hundredth of an hour. Counters 81 and 82 are provided with manual reset buttons or switches 87 and 88, respectively, for resetting these counters to zero when desired.

Selector switch 86 for the counters 81 and 82 is mechanically ganged with the master "on-off" switch 51 located in the output circuit for the pulser mechanism 32. This is indicated by the mechanical linkage represented by dash line 90. This mechanical linkage 90 is also mechanically connected to an actuating member or switch handle 91. Movement of the switch handle 91 changes the positions of the switches 51 and 86. This switch handle 91 is located on the drilling control panel 20 (FIG. 1) and is set to place the switches 51 and 86 in the positions shown in FIG. 2 whenever the drill bit is actually drilling hole. Conversely, switch handle 91 is set to place these switches 51 and 86 in their opposite positions whenever the drill bit is not drilling hole. Thus, the master "on-off"

switch 51 is operated to disable or turn off the rate of penetration measuring apparatus whenever the drill bit is not actually drilling hole.

Referring now to FIG. 3 of the drawings, there is shown a detailed schematic circuit diagram of the pulse-to-analog converter 38. Each of the other pulse-to-analog converters 39 and 40 are of this same construction. As seen in FIG. 3, the pulse-to-analog converter 38 includes a pair of decade sections 101 and 102. The first or "units" decade section 101 includes a pair of decade-type stepping switches 103 and 104 which are driven by an armature winding 105. Pulsing of the armature winding 105 advances the movable contact arms of the switches 103 and 104 in unison from one stationary contact position to the next. The second decade section or "tens" section 102 includes a pair of decade-type stepping switches 106 and 107 which are driven by a second armature winding 108. Pulsing of the armature winding 108 advances the movable contact arms of the switches 106 and 107 in unison from one stationary contact position to the next. As will be seen, the incoming pulses on conductor 61b drive the "units" section 101, while the "units" section 101, in turn, drives the "tens" section 102.

Considering first the manner in which the analog output signal is formed, the output conductors 61c and 61d are connected to the movable contact arms of the switches 104 and 107. These switches 104 and 107 have connected between the stationary contacts thereof appropriate sets of resistors which are used to provide a pair of potentiometers which are connected in series with one another. The complete potentiometer circuit can be seen by starting at the positive direct-current voltage terminal +V, proceeding to the No. 9 stationary contact on the switch 107, then through the set of resistors for the switch 107, out through the zero position stationary contact, then by way of a conductor 109 to the zero position stationary contact of the switch 104, then through the set of resistors for the switch 104 and out through the No. 9 stationary contact of the switch 104 and to the negative direct-current voltage terminal —V. The movable contact arms of the switches 104 and 107 serve to introduce incremental direct-current voltage values between the output conductors 61c and 61d as these movable contact arms are advanced in a counterclockwise direction from their zero positions. The resistors for the tens switch 107 are provided with resistance values which are ten times greater than the resistance values for the resistors on the units switch 104. As a consequence, the voltage increments provided by switch 107 are ten times as large as the voltage increments provided by the switch 104. By way of example, the resistance values and the voltage values may be chosen so that the output direct-current voltage between the output conductors 61c and 61d can be varied from zero to ten volts in 0.1 volt steps.

Considering now the manner of advancing the movable contact arms of the switches 104 and 107, this action results from the closures of the pulser switch 37 shown in FIG. 2, assuming that the master "on-off" switch 51 is in the "on" position and that the movable contact element of the stepping relay switch section 47b is at the conductor 61b position, both as shown in FIG. 2. In particular, each closing and opening of the pulser switch 37 causes a pulse of current to flow from the positive direct-current voltage terminal +V of FIG. 3, through the armature winding 105 of the units decade section 101 and back to the negative terminal of the power supply 46 (FIG. 2) by way of the conductor 61b. In other words, for the assumed switch 47b and switch 51 conditions, the pulser switch 37 may be thought of as being connected between the pulse input conductor 61b and the —V negative supply terminal of FIG. 3. Each pulse of current through the armature winding 105 serves to advance the movable contact arms of switches 103 and 104 to the next one of the stationary contact positions. After nine such current pulses, the contact arm of the switch 103 is at its No. 9 position. This serves to complete a circuit running from the +V supply terminal, through the tens decade armature winding 108, a diode 110 and the switch 103 to the pulse input conductor 61b. As a consequence, the next time the pulser switch 37 closes and opens, a pulse of current is also caused to flow through the tens decade armature winding 108. This advances the movable contact arms of the ten switches 106 and 107 by one position at the same time that the contact arms of the units switches 103 and 104 are returned to their zero positions. In this manner, tens switches 106 and 107 are caused to advance one position for each complete revolution of the units switches 103 and 104.

Considering now the reset mechanism, it must be initially noted that in order for the reset operation to occur, the stepping relay mechanism 47 must have advanced in such a manner that the pulser switch 37 is no longer connected to the pulse input conductor 61b and, on the other hand, the 60 cycle per second signal from reset signal source 44 is applied between the reset conductor 61a and the positive voltage supply terminal +V of FIG. 3. The positive half cycles of the sixty cycle alternating-current voltage appearing on the reset conductor 61a are passed by way of diodes 111, 112 and 113 and are used to pulse the armature windings 105 and 108 until the various switches 103, 104, 106 and 107 are returned to their zero positions. In particular, the positive half cycles passed by the diode 111 are effective to pulse the armature winding 105 whenever the contact arm of switch 103 is in any of the Nos. 1 through 8 positions. After passing through the winding 105, these positive half cycles are returned to the reset signal source 44 by way of the positive direct-current supply line +V. Similarly, the positive half cycles passed by the diode 112 are effective to pulse the armature winding 108 whenever the contact arm of the switch 106 is in any of the Nos. 1 through 8 positions. Diode 112 also supplies the positive half cycle for the first armature winding 105 when the switch 103 is at its No. 9 position. Diode 113 supplies the positive half cycle to the second armature winding 108 when the switch 106 is at its No. 9 position. In this manner, the switches 103, 104, 106 and 107 are quickly returned to their zero positions. They remain at such zero positions until such time as the pulse-to-analog converter 38 is again called upon to count the pulses produced by the pulser mechanism 32.

From the foregoing, it can be seen that the pulses-to-analog converter 38 of FIG. 3 possesses several significant circuit functions. In the first place, it serves to integrate or count the number of transducer pulses occurring during the time interval during which the converter 38 is connected to the pulser mechanism 32. Secondly, it serves to convert the total count value into a direct-current type of analog signal having an amplitude which is proportional to the total pulse count. This occurs because the pulse counting mechanism also drives the potentiometer switches 104 and 107. Thus, the converter 38 converts the pulse number into an analog signal amplitude. In addition, the converter 38 also provides a memory or storage function. This is because the converter 38 serves to store or hold both the total pulse count value and the corresponding analog amplitude value during the time interval occurring between the disconnecting of the converter 38 from the pulser mechanism 32 and the connecting of the converter 38 to the reset signal source 44. It is during these periodic holding or storage intervals that the converter 39 is connected to the indicator devices 41 and 42 by the stepping relay mechanism 47. These same observations also apply to the other pulse-to-analog converters 39 and 40 because they are also of this same form of construction.

OPERATION OF THE PREFERRED EMBODIMENT

Considering now the operation of the apparatus shown in FIGS. 1 and 2, it is helpful to consider the general features of the operation of the drilling rig 10 shown in FIG. 1. As the drilling progresses, the kelly 19 and the drill pipe attached to the bottom end thereof move in a downwardly direction until it becomes necessary to add a new joint or length of drill pipe to the drill string. At such time, the drawworks 13 is operated to raise the traveling block 15 and the kelly 19 until the upper end of the top joint of drill pipe is a short distance above the rotary table 21. With the drill pipe being held by the rotary table 21, the kelly 19 is disconnected therefrom. The kelly 19 is then connected to the end of a new joint of drill pipe. The traveling block 15 is then elevated and the other end of this new joint is then connected to the top joint of the drill string. The drill string is then lowered back into the borehole and the rotation of the rotary table 21 again commenced. Swivel 18, of course, allows rotation of the kelly 19 without causing rotation of the traveling block 15.

The drill bit at the bottom end of the drill string is forced against the bottom of the hole by the weight of the drill pipe attached thereto. The weight applied to the drill bit is called the "bit weight." Normally, the entire weight of the drill string is not applied to the bit. Instead, most of the weight is held by the hoisting mechanism associated with the traveling block 15 and only a relatively small fraction of the total weight is applied to the drill bit. An indication of the bit weight is provided by the weight indicator meter on the meter panel 23. The driller controls the drawworks 13 by means of the brake handle 22 to lower the traveling block 15 until the desired weight is applied to the drill bit. The driller then applies the brakes on the drawworks 13 and this holds the traveling block 15 stationary. The portion of the weight applied to the rotating drill bit causes such bit to dig downwardly into the earth. This causes the bit weight to decrease. The driller observes this decrease on the weight indicator meter. When the bit weight has decreased to a particular value, the driller again releases the brake mechanism on the drawworks 13 so as to lower the traveling block 15 enough to bring the bit weight back up to its original value. The driller again applies the brakes on the drawworks 13 so as to again hold the traveling block 15 stationary. This repeated releasing and applying of the brakes on the drawworks 13 is continued until it again becomes necessary to add another joint or drill pipe to the drill string.

The foregoing describes a manual manner of controlling the brakes on the drawworks during the downward drilling movement. It should be noted, however, that a goodly number of modern drilling rigs are equipped with automatic devices for controlling the releasing and applying of the drawworks brakes. Such devices enable the bit weight to be held more nearly constant, thereby improving the efficiency of the drilling operation.

The recurrent downward movements of the traveling block 15 as the drill bit drills further into the earth are monitored by the measuring wheel 28 which is rotated by the movement of the measuring line 25 which is attached to the traveling block 15. As seen in FIG. 2, rotation of the measuring wheel 28, and hence the gear wheel 33, causes a recurrent closing and opening of the pulser switch 37. Whether or not this closing and opening of pulser switch 37 is sensed by the remainder of the apparatus, depends upon whether the master "on-off" switch 51 is at its "on" position or its "off" position. This switch 51 is operated by the driller by means of the switch handle 91 (FIG. 2) which, in practice, is located on the control panel 20 of FIG. 1. During the downward drilling movements of the traveling block 15, the driller sets the switch handle 91 so that the master switch 51 is in the "on" position. During any non-drilling period of activity, such as when adding a joint of drill pipe, the driller sets the switch handle 91 so that the master switch 51 is in "off" position. In practice, the switch handle 91 may be combined with the switch handle for one of the other drilling rig mechanisms that needs to be modified or disabled during non-drilling activities. For the remainder of this discussion, it will be assumed that the master switch 51 is in the "on" position as shown in FIG. 2.

The three pulse-to-analog converters 38, 39 and 40, under the control of the stepping relay mechanism 47, take turns in counting the pulses produced by the closings and openings of the pulser switch 37, supplying an analog signal to the indicator devices 41 and 42, and in getting reset by the reset signal source 44. For example, during a first integration interval or counting interval, the converter 38 is connected to the pulser switch 37, the converter 39 is connected to the reset signal source 44, and the converter 40 is connected to the indicator devices 41 and 42. During the next integration interval, converter 39 is connected to the pulser switch 37, converter 40 is connected to the reset signal source 44, and converter 38 is connected to the indicator devices 41 and 42. During the next integration interval after that, the converter 40 is connected to the pulser switch 37, the converter 38 is connected to the reset signal source 44, and the converter 39 is connected to the indicator devices 41 and 42. During the next integration interval, the converters 38, 39 and 40 are returned to the first considered set of connections and thereafter the foregoing sequence is repeated.

Because of the use of three pulse-to-analog converters 38, 39 and 40, this means that at any given instant one of the converters 38, 39 and 40 is coupled to the pulser mechanism 32. It also means that at any given instant one of the converters 38, 39 and 40 is coupled to the indicator devices 41 and 42. Thus, the system as a whole is continuously operative to count transducer pulses and is continuously operative to supply an analog signal to the indicator devices 41 and 42. Thus, in effect, measurements are being made and recorded 100% of the time.

The rate of switching of the converters 38, 39 and 40 is the same as the rate of occurrence of the periodic timing pulses which are supplied to the transistor switching circuit 70 by the selector switch 69. The rate of occurrence of these timing pulses, together with the maximum counting capacity of the counting mechanisms in the converters 38 39 and 40 (nominally, 100 counts), determines the full-scale rate of penetration value for any given position of the timing pulse selector switch 69. Assume, for example, that the measuring wheel 28 and the pulser mechanism 32 are constructed to generate 100 pulses per foot of downward movement of the traveling block 15 and, hence, of the drill bit. If then the drill bit is penetrating into the earth at the rate of 100 feet per hour, this means that the drill bit will move a distance of one foot in a 36 second time interval. This produces 100 pulser mechanism pulses in such 36 second time interval. If the selector switch 69 is at the middle position as shown in FIG. 2, the pulses supplied to the transistor switching circuit 70 are occurring at the rate of one pulse every 36 seconds. This means that each of the converters 38, 39 and 40, in its turn, is connected to the pulser mechanism 32 for a time interval of 36-seconds. Since, for the assumed rate of penetration, 100 pulses were produced for such a 36-second time interval, this means that the two-decade decimal counter mechanism in each of the converters 38, 39 and 40 will be filled to capacity during its 36-second counting interval. Thus, for the middle position of the selector switch 60, the maximum rate of penetration value that can be handled by the system is 100 feet per hour.

In order to handle a maximum rate of penetration value of 200 feet per hour, the selector switch 69 is set to the left-hand position. This provides an 18-second counting interval for each of the converters 38, 39 and 40. Thus, the pulser mechanism pulses have to occur twice as fast in order to fill the converter counters. In the other direction, if it is desired to have the system accommodate a maximum penetration rate of 50 feet per hour, then the selector switch 69 is set to the right-hand position. This provides 72-second counting intervals for the converter counters.

Thus is seen a major advantage of the present measuring apparatus, namely, that the full-scale reading of the apparatus can be changed merely by selecting a different rate for the timing pulses which control the integration intervals. Note that the range of analog output values produced by each of the converters 38, 39 and 40 remains the same even though the timing pulse rate is varied. Thus, the sensitivities of the indicator devices 41 and 42 need not be adjusted when changing from one rate of penetration range to another. For operator convenience, the indicator devices 41 and 42 should be provided with three sets of scale markings corresponding to the three ranges provided by the selector switch 69. These scale markings are preferably such as to express the rate of penetration values in terms of feet per hour.

As previously indicated, the recorder 42 provides a permanent record or chart of the rate of penetration of the drill bit as a function of the depth of the drill bit in the borehole. The depth drive for the recorder 42 is obtained by way of the transformer 43 from the current pulses which are produced by the closings and openings of the pulser switch 37.

Basically, rate of penetration is obtained by dividing distance by time. In the present apparatus, distance is represented by the incremental "distance" pulses generated by the pulser mechanism 32, while time is represented by the timing pulses selected by the selector switch 69. For any given setting of the selector switch 69, the time factor becomes a known constant. Thus, rate of penetration becomes directly proportional to the distance traveled (incremental distance pulses counted) during the fixed time intervals established by the selected timing pulses.

In selecting the optimum values for the pulse rates for the timing pulses which are made available at the timing pulse selector switch 69, two opposing considerations should be taken into account. One of these considerations is that the dial-type meter 41 and the recorder 42 should provide fairly smooth indications which are not jumping about in a manner which makes them difficult to read. In this regard, if the intervals between the timing pulses are too short, then sometimes the traveling block 15 will not have made any downward movement during some of these time intervals. When this occurs, the pointer of the meter 41 and the recording pen in the recorder 42 will go to zero and then, subsequently, return to a more proper reading when the traveling block 15 does move. In other words, the integrating time or counting time for the transducer pulses should be made long enough to provide a fairly smooth and easy to read presentation on the meter 41 and the recorder 42. If, on the other hand, the integrating time or counting time is to long, then the current rate of penetration value indicated by the meter 41 and the recorder 42 is no longer very closely related to the current instantaneous value of the drill bit penetration rate. There is too much of a time lag in performing the integration process. This means that the driller will not be very quickly informed of any change in the rate of penetration. It also means that if a relatively thin bed of different hardness is drilled through, then the occurrence of this bed may not even be noticed. In other words, momentary, short duration changes in penetration rate will be "averaged out."

The 18-second, 36-second and 72-second integration intervals which are provided with the timing circuit means of FIG. 2 have been found to be highly satisfactory for the case of drilling rigs which are provided with automatic mechanisms for automatically controlling the braking of the drawworks when the drill bit is drilling. This selection of integration intervals enables the providing of a fairly smooth indicator presentation, while at the same time enabling the system to be quickly responsive to sudden changes in the rate of penetration. If, for example, a 36 second integration interval is selected and if the drilling is progressing at a rate of 50 feet per hour, this means that the rate of penetration is being measured once for every one-half foot of movement of the drill bit. This means that the driller is advised of a change in the penetration rate in about the same length of time it takes the drill bit to move one-half of a foot. Thus, the response of the system is fairly quick.

For the case of drilling rigs where manual braking of the drawworks is utilized, it has been found to be more desirable to provide integration intervals of 36 seconds, 72 seconds and 144 seconds. This can be accomplished with the FIG. 2 circuits by connecting an additional divide-by-two frequency divider to the output of divider 68 and connecting the output of this additional divider to an additional stationary contact position on the timing pulse selector switch 69.

The present measuring apparatus provides apparatus which accurately measures the rate of penetration of the drill bit. This rate of penetration is expressed in feet per hour on the meter 41 and on the log produced by the recorder 42. Knowledge of this rate of penetration is highly useful. For example, if all the other factors which affect the rate of penetration are known, then the only factor to cause a variation of the rate of penetration would be the hardness of the subsurface formations. With the advent of automation, most of these other variables, such as bit weight, rotating speed, mud weight and drilling torque, can be controlled and programmed. If these other factors are controlled, then the rate of penetration log recorder by the recorder 42 becomes a log of the formation hardness and, hence, of the formations themselves.

In addition to rate of penetration, the present measuring apparatus also provides indications of the total footage drilled by the drill bit, the total time actually spent by the drill bit in drilling, and the total non-drilling time. These indications are provided by counters 75, 81 and 82 respectively. Among other things, the total bit footage and total bit drilling time indications provide the driller with additional information whereby he can better judge when it is time to pull the drill string and change the drill bit.

While there has been described what is at present considered to be a preferred embodiment of this invention, it will be obvious to those skilled in the art that various changes and modifications may be made therein without departing from the invention, and it is, therefore, intended to cover all such changes and modifications as far within the true spirit and scope of the invention.

What is claimed is:

1. Measuring apparatus for determining the rate of penetration of a drill bit in drilling a borehole into the earth comprising:

transducer means for sensing downward movement of the drill pipe supporting the drill bit and producing electrical signal changes indicative of such movement;

and circuit means for detecting the electrical changes over a predetermined time interval and for producing an output signal representing the rate of penetration of the drill bit, which circuit means includes integrator means for integrating the electrical signal changes over a predetermined time interval and wherein said integrator means performs repetitive integrations over successive time intervals of equal duration and includes means for storing the output signal produced during one integration interval while the integrator means is performing the integration for the next interval.

2. Measuring apparatus for determining the rate of penetration of a drill bit in drilling a borehole into the earth comprising:

transducer means for sensing downward movement of the drill pipe supporting the drill bit and producing electrical pulses representing incremental amounts of such movement;

integrator means responsive to the transducer pulses for producing output signals representing the number of such pulses occurring during successive integration intervals, which integrator means includes means for storing the previous output signal during the next succeeding integration interval;

circuit means coupled to the integrator means for controlling the integration intervals such that each is of the same predetermined timed duration;

and signal indicator means responsive to the integrator output signals for providing indications of the rate of penetration of the drill bit, which signal indicator means is coupled to the integrator means so as to be responsive to the stored output signals.

3. Measuring apparatus for determining the rate of penetration of a drill bit in drilling a borehole into the earth comprising:

transducer means for sensing downward movement of the drill pipe supporting the drill bit and producing electrical pulses representing incremental amounts of such movement;

integrator means responsive to the transducer pulses for producing output signals representing the number of such pulses occurring during successive integration intervals;

circuit means coupled to the integrator means for controlling the integration intervals such that each is of the same predetermined time duration, and which circuit means includes means for adjusting the time duration of the integration intervals to accommodate different ranges of penetration rates;

and signal indicator means responsive to the integrator output signals for providing indications of the rate of peneration of the drill bit.

4. Measuring apparatus for determining the rate of penetration of a drill bit in drilling a borehole into the earth comprising:

transducer means for sensing downward movement of the drill pipe supporting the drill bit and producing electrical pulses representing incremental amounts of such movement;

a plurality of integrator means each of which is responsive to input pulses for producing an output signal representing the number of such pulses;

signal indicator means capable of responding to such integrator output signals for providing indications of the rate of penetration of the drill bit;

switching means for sequentially coupling the inputs of the integrator means to the transducer means and for sequenially coupling the outputs of the integrator means to the signal indicator means, the switching means being constructed so that at any given instant the transducer means and the signal indicator means are coupled to different ones of the integrator means;

and timing means for advancing the switching means at a predetermined periodic rate.

5. Measuring apparatus in accordance with claim 4 wherein each integrator means includes a pulse counter and means for converting the counter total into an analog signal proportional to such total.

6. Measuring apparatus in accordance with claim 4 which further includes means for resetting each integrator means before its input is again coupled to the transducer means.

7. Measuring apparatus for determining the rate of penetration of a drill bit in drilling a borehole into the earth comprising:

transducer means for sensing downward movement of the drill pipe supporting the drill bit and producing electrical pulses representing incremental amounts of such movement;

three integrator units each including a pulse counter and means for converting the counter total into an analog signal proportional to such total;

signal indicator means capable of responding to such analog signals for providing indications of the rate of penetration of the drill bit;

circuit means for supplying pulse counter reset signals;

a stepping relay mechanism including first switch means for sequentially coupling the pulse counter inputs of the integrator units to the transducer means, second switch means for sequentially coupling the analog signal outputs of the integrator units to the signal indicator means, and third switch means for sequentially coupling the reset signal circuit means to the different ones of the pulse counters, the operation of these switch means being staggered so that at any given instant one of the integrator units is counting transducer pulses, the one that was previously counting is now supplying an analog signal to the signal indicator means and the one that was previously supplying an analog signal is now coupled to the reset signal circuit means; and timing circuit means for supplying periodic timing signals to the stepping relay mechanism for advancing the switch means therein at a predetermined rate.

8. Measuring apparatus in accordance with claim 7 wherein the transducer means includes a measuring line coupled to the traveling block of the drilling rig, spooling means for keeping the measuring line taut, measuring wheel means engaging the measuring line and rotating in accordance with movement of such line and a pulser mechanism coupled to the measuring wheel means for producing electrical pulses representing incremental amounts of measuring line movements.

9. Measuring apparatus in accordance with claim 7 wherein the timing circuit means includes means for adjusting the frequency of the timing signals for accommodating different ranges of penetration rates.

10. Measuring apparatus in accordance with claim 7 and further including counter means responsive to the transducer pulses for providing indications of the total footage drilled by the drill bit.

11. Measuring apparatus in accordance with claim 7 and further including counter means coupled to the timing circuit means for providing indications of the total bit drilling time.

12. Measuring apparatus in accordance with claim 7 and further including a pair of counter means and switch means for selectively coupling these counter means to the timing circuit means for enabling one of these counter means to provide indications of the total bit drilling time and for enabling the other of these counter means to provide an indication of the total non-drilling time.

References Cited

UNITED STATES PATENTS 2,330,753 9/1943 Sikes _____ 73—151.5
3,374,669 3/1968 Redwine _____ 73—151.5

JERRY W. MYRACLE, Primary Examiner

UNITED STATES PATENT OFFICE

CERTIFICATE OF CORRECTION

Patent No. 3,522,727          Dated August 4, 1970

Charles W. Calhoun

It is certified that error appears in the above-entitled patent and that said Letters Patent are hereby corrected as shown below:

Column 1, line 33, "fee" should read --feet--. Column 2, line 54, and column 3, line 8, "ring", each occurrence, should read --rig--. Column 3, line 48, "elements" should read --element--. Column 4, line 29, "pirmary" should read --primary--; line 45, "contace" should read --contact--; and line 65, "pulse" should read --pulser--. Column 8, line 8, "ten" should read --tens--; line 46, "pulses" should read --pulse--; and line 66, "39" should read --38--. Column 11, line 55, "to" should read --too--. Column 13, line 55, "sequenially" should read --sequentially--.

SIGNED AND
SEALED
NOV 3 1970

(SEAL)
Attest:

Edward M. Fletcher, Jr.
Attesting Officer

WILLIAM E. SCHUYLER, JR.
Commissioner of Patents